(12) United States Patent
Fuchuya

(10) Patent No.: US 12,411,096 B2
(45) Date of Patent: Sep. 9, 2025

(54) ARTICLE HANDLING SYSTEM

(71) Applicant: ISHIDA CO., LTD., Kyoto (JP)

(72) Inventor: Kosuke Fuchuya, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 273 days.

(21) Appl. No.: 17/891,142

(22) Filed: Aug. 19, 2022

(65) Prior Publication Data

US 2023/0066062 A1    Mar. 2, 2023

(30) Foreign Application Priority Data

Aug. 30, 2021 (JP) ................. 2021-139676

(51) Int. Cl.
*G01N 23/04* (2018.01)
(52) U.S. Cl.
CPC ..... *G01N 23/04* (2013.01); *G01N 2223/1016* (2013.01); *G01N 2223/306* (2013.01)
(58) Field of Classification Search
CPC ...... G01N 23/04; G01N 23/083; G01N 23/10; G01N 23/18; G01N 2223/1016; G01N 2223/306
See application file for complete search history.

(56) References Cited

U.S. PATENT DOCUMENTS

2015/0314331 A1   11/2015  Thorsson

FOREIGN PATENT DOCUMENTS

| CN | 111796336 A | 10/2020 |
|---|---|---|
| EP | 3693875 A1 | 8/2020 |
| EP | 3800468 A1 | 4/2021 |
| EP | 3862748 A1 | 8/2021 |
| JP | 2002-355244 A | 12/2002 |
| JP | 2003-121388 A | 4/2003 |
| JP | 2004-233151 A | 8/2004 |
| JP | 2007-256070 A | 10/2007 |
| JP | 2011-185685 A | 9/2011 |
| JP | 2012-234481 A | 11/2012 |
| JP | 2018-005432 A | 1/2018 |
| JP | 2018-101945 A | 6/2018 |

(Continued)

OTHER PUBLICATIONS

Extended Search Report in the corresponding European Patent Application No. 22192347.7 dated Jan. 18, 2023.

*Primary Examiner* — David P Porta
*Assistant Examiner* — Casey Bryant
(74) *Attorney, Agent, or Firm* — Global IP Counselors, LLP

(57) ABSTRACT

An article handling system includes: an article handling device including an article handling unit that executes handling with respect to an article, and a conveying unit configured to convey the article into the article handling unit and configured to convey out the article from the article handling unit; a remote device that is connected at a location spaced apart from the article handling device in a communication possible manner through a network, and includes a remote control unit that remotely controls the article handling device; an acquisition unit that acquires information on an ambient environment of the article handling device; a determination unit that determines whether or not a worker is present in a vicinity of the article handling device on the basis of the information on the ambient environment; and a transmission unit that transmits a determination result in the determination unit to the remote control unit.

11 Claims, 7 Drawing Sheets

(56) References Cited

FOREIGN PATENT DOCUMENTS

| | | |
|---|---|---|
| JP | 2019-124588 A | 7/2019 |
| KR | 1020160094470 A | 8/2016 |
| KR | 20200099403 A | 8/2020 |
| WO | 2019/240051 A1 | 6/2021 |

ARTICLE HANDLING SYSTEM

TECHNICAL FIELD

An aspect of the invention relates to an article handling system.

BACKGROUND

An article inspection device such as an X-ray inspection device, a metal detection device, and a weight inspection device which inspects a quality state of an article is known. In the article inspection device, setting data relating detection conditions or determination conditions for every kind are stored for every device. The setting data can be manually changed for every device, but a burden on a worker increases in a method of performing setting for every device, and inspection accuracy may be affected by a setting value input by the worker. Japanese Unexamined Patent Publication No. 2007-256070 discloses a configuration in which the setting data can be set from an external device different from the article inspection device.

SUMMARY

In recent, it is desired not only to set various pieces of setting data from an outer side with respect to an article handling device that executes arbitrary handling on an article and but also to remotely operate various operations of the article handling device from a faraway location in addition to the article inspection device. However, operations of the article handling device also include an operation that poses a danger to a worker who is working in a vicinity of the article handling device, and thus it is desired to remotely operate the article handling device while ensuring safety for the worker.

Here, an object of an aspect of the invention is to provide an article handling system capable of remotely operating an article handling device while ensuring safety for a worker.

According to an aspect of the invention, there is provided an article handling system including: an article handling device including an article handling unit configured to execute handling with respect to an article, and a conveying unit configured to convey the article into the article handling unit and configured to convey the article out from the article handling unit; a remote device connected at a location spaced apart from the article handling device a network, and including a remote control unit configured to perform remote control of the article handling device; an acquisition unit configured to acquire information on an ambient environment of the article handling device; a determination unit configured to determine whether or not a worker is present in the vicinity of the article handling device on the basis of the information on the ambient environment; and a transmission unit configured to transmit a determination result in the determination unit to the remote control unit.

In this configuration, the determination result determined on the basis of the information on the ambient environment of the article handing device which is acquired by the acquisition unit can be confirmed in the remote device that is disposed at a location spaced apart from the article handling device. That is, since presence or absence of a worker being present in the vicinity of the article handing device can be confirmed in the remote device, the article handling device can be remotely operated while ensuring safety for the worker.

In the article handling system according to the aspect of the invention, the transmission unit may transmit the determination result in a case where at least one of the article handling unit and the conveying unit is operating. In this configuration, in a case where a danger may be posed to a worker being present in the vicinity of the article handling device, since information on presence or absence of the worker being present in the vicinity of the article handling device can be reliably obtained, it is possible to prevent a danger from being posed to the worker in advance.

In the article handling system according to the aspect of the invention, the remote control unit may restrict which operation can be performed by the remote device on the article handling device on the basis of the determination result. In the article handling system having this configuration, since it is restricted to perform an operation that may pose a danger to a worker being present in the vicinity of the article handling device on the basis of a situation of the worker being present in the vicinity of the article handling device, it is possible to prevent a danger from being posed to the worker in advance.

The article handling system according to the aspect of the invention may further include an operation control unit configured to restrict which operation can be performed by the remote device on the article handling device on the basis of the determination result. In the article handling system having this configuration, since it is restricted to perform an operation that may pose a danger to a worker being present in the vicinity of the article handling device on the basis of a situation of the worker being present in the vicinity of the article handling device, it is possible to prevent a danger from being posed to the worker in advance.

In the article handling system according to the aspect of the invention, the acquisition unit may acquire information on a first region being a region within a first distance from a reference position and information on a second region being a region outside of the first region and within a second distance longer than the first distance, the reference position being set as a position where the article handling device is disposed, the determination unit may determine whether or not the worker is present in the first region on the basis of the information on the first region and may determine whether or not the worker is present in the second region on the basis of the information on the second region, and in a case where it is determined the worker is present in the first region, the remote control unit may severely restrict which operation can be performed by the remote device on the article handling device in comparison to a case where it is determined that the worker is present in the second region. In this configuration, an operation that is restricted in the article handling device is appropriately set on the basis of a positional relationship between the article handling device and the worker, and thus it is possible to suppress handing capability of the article handling device from deteriorating.

In the article handling system according to the aspect of the invention, the acquisition unit may acquire information on a first region being a region within a first distance from a reference position, and information on a second region being a region outside of the first region and within a second distance longer than the first distance, the reference position being set as a position where the article handling device is disposed, the determination unit may determine whether or not the worker is present in the first region on the basis of the information on the first region and may determine whether or not the worker is present in the second region on the basis of the information on the second region, and in a case where it is determined the worker is present in the first region, the operation control unit may severely restrict which operation con be operated by the remote device on the article handling device in comparison to a case where it is determined that the worker is present in the second region. In this configuration, an operation that is restricted in the article handling device is appropriately set on the basis of a positional relationship between the article handling device and the worker, and thus it is possible to suppress handing capability of the article handling device from deteriorating.

In the article handling system according to the aspect of the invention, the remote device may include a first display unit configured to enable displaying of the determination result. In this configuration, it is possible to effectively notify an operator of a situation of a worker being present in the vicinity of the article handling device.

In the article handling system according to the aspect of the invention, the article handling device may include a second display unit configured to display a state of the article handling device, and the first display unit and the second display unit may be configured to enable displaying of whether or not the article handling device is being remotely controlled by the remote device. In this configuration, since an operator who operates the article handling device and an operator who operates the remote device can perform operations while confirming that the device to be operated is in which state, it is possible to prevent an operation that may pose a danger to a worker.

In the article handling system according to the aspect of the invention, the acquisition unit may be a sensor so as to detect an object located in a region below a conveying surface of the conveying unit in a vertical direction. In this configuration, it is easy to detect a worker being present in the vicinity of the article handling device regardless of a body size and a posture of the worker.

In the article handling system according to the aspect of the invention, the acquisition unit may be provided with the article handling device. In this configuration, it is possible to easily construct a configuration of acquiring information on a worker being present in the vicinity of the article handling device.

In the article handling system according to the aspect of the invention, the article handling device may be an X-ray inspection device including an X-ray irradiation unit configured to irradiate the article with X-rays as the article handling unit, and the conveying unit configured to convey the article into a position where irradiation with the X-rays is performed by the X-ray irradiation unit and to convey the article out from the position. In this configuration, it is possible to remotely operate the X-ray inspection device while ensuring safety for a worker.

According to the invention, it is possible to remotely operate an article handling device while ensuring safety for a worker.

DETAILED DESCRIPTION

Figure 1:
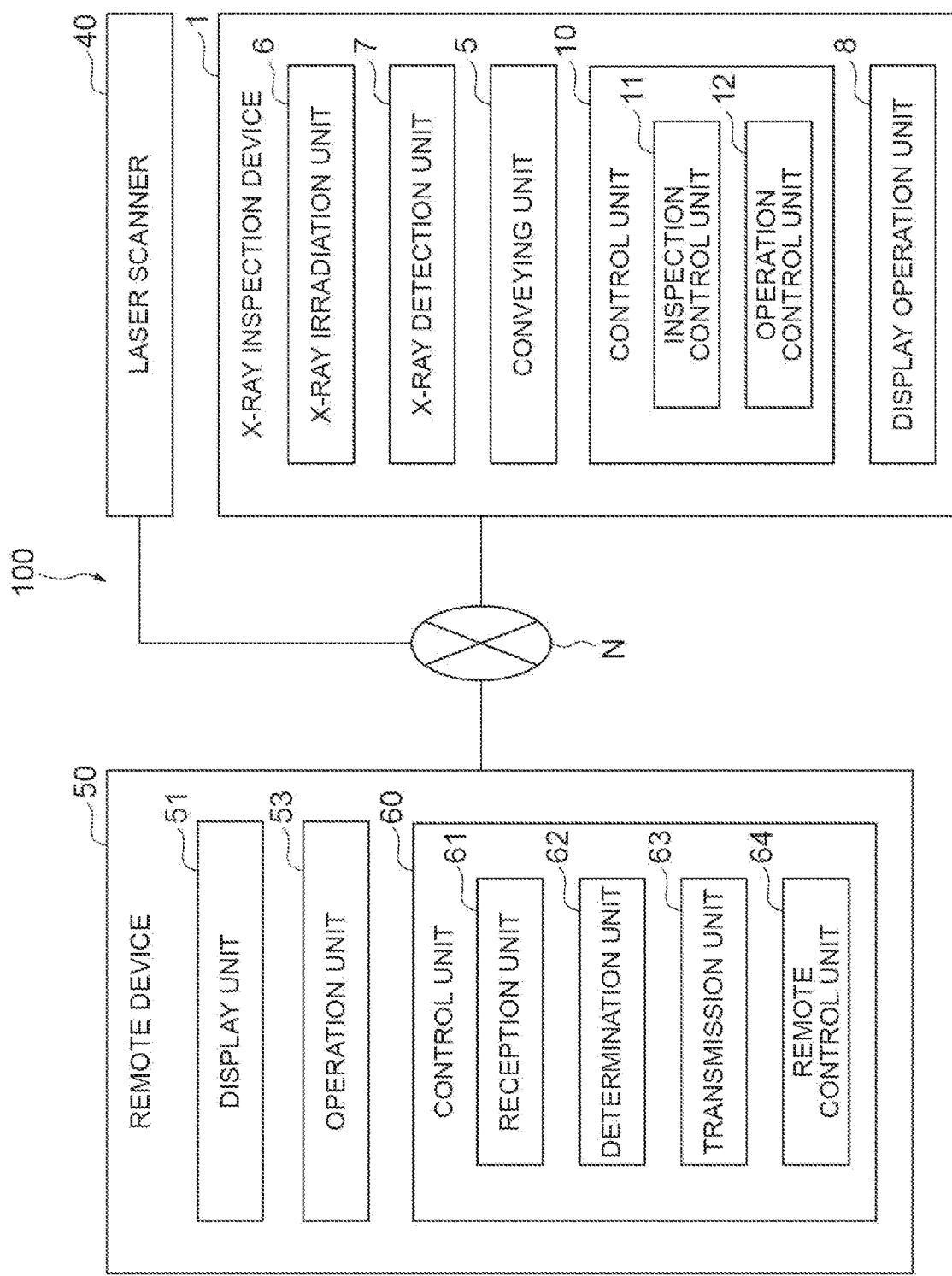
FIG. 1 is a block diagram illustrating a functional configuration of an article handling system according to an embodiment.

Hereinafter, an article handling system 100 that is a preferred embodiment of the invention will be described with reference to the accompanying drawings. Note that, in description of the drawings, the same reference numeral will be given to the same element and redundant description will be omitted.

Figure 2:
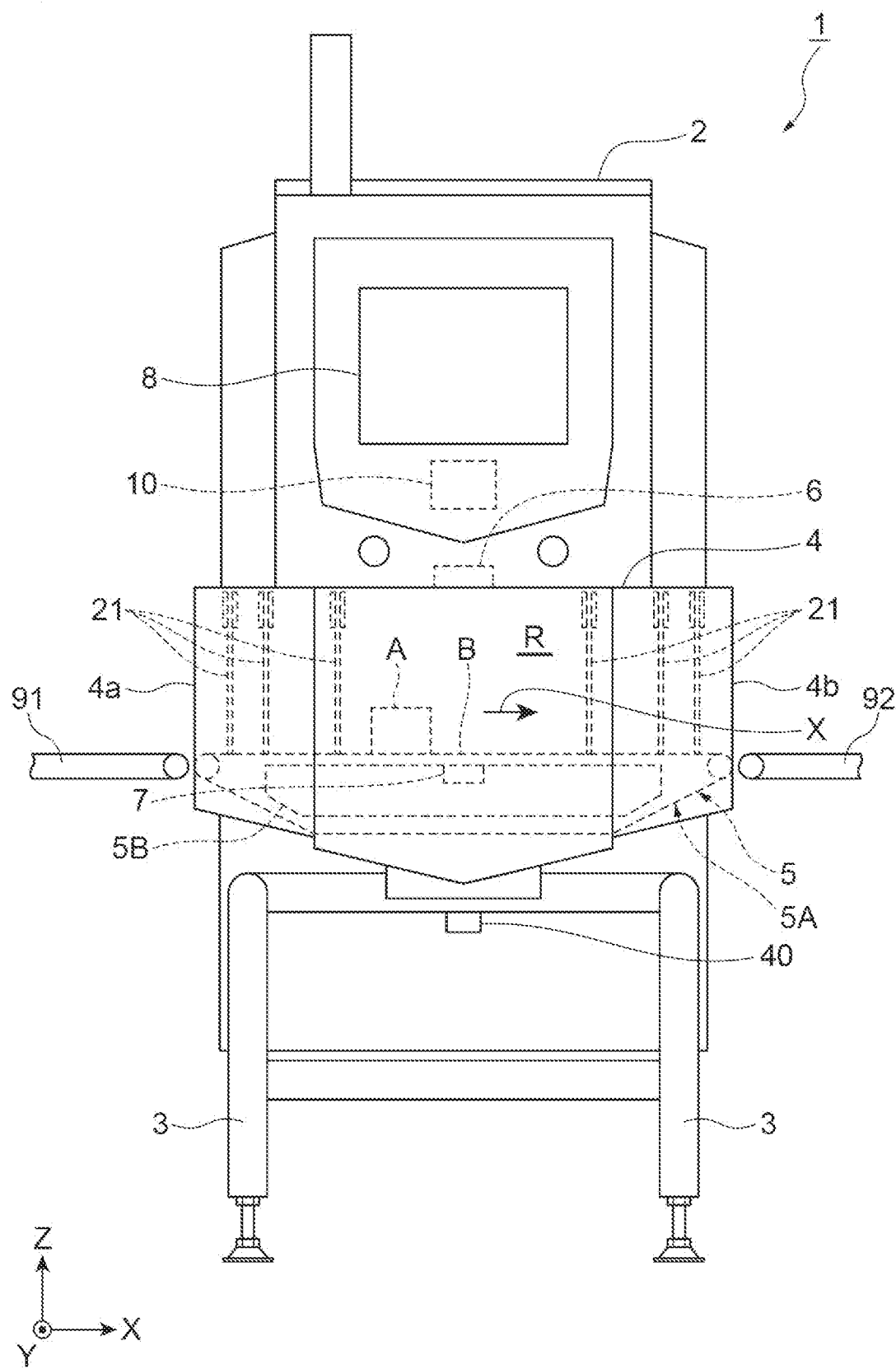
FIG. 2 is a front view illustrating a schematic configuration of an X-ray inspection device included in the article handling system.

As illustrated in FIG. 1, the article handling system 100 includes an X-ray inspection device 1, a remote device 50, and a laser scanner (acquisition unit) 40. As illustrated in FIG. 1 and FIG. 2, the X-ray inspection device 1 is a device that acquires an X-ray transmission image of an article A while conveying the article A, and performs inspection for the article A (for example, storage quantity inspection, foreign matter mixing-in inspection, defect inspection, crack chipping inspection, or the like) on the basis of the X-ray transmission image. The remote device 50 is a device configured to operate various operations of the X-ray inspection device 1 at a location spaced apart from a location where the X-ray inspection device 1 is disposed.

The X-ray inspection device 1 includes a device main body 2, a support leg 3, a shield box 4, a conveying unit 5, an X-ray irradiation unit (article handling unit) 6, an X-ray detection unit 7, a display operation unit (second display unit) 8, and a control unit 10.

Note that, an article A before inspection is conveyed into the X-ray inspection device 1 by a carrying-in conveyor 91, and the article A after inspection is conveyed out from the X-ray inspection device 1 by a carrying-out conveyor 92. An article A that is determined as a defective product by the X-ray inspection device 1 is sorted out of a production line by a distribution device (not illustrated) disposed downstream of the carrying-out conveyor 92. An article A that is determined as a good product by the X-ray inspection device 1 passes the distribution device as is.

The device main body 2 accommodates the control unit 10 and the like. The support leg 3 supports the device main body 2. The shield box 4 is provided with the device main body 2 and prevents X-rays from being leaked from an irradiation space R of the X-rays emitted from the X-ray irradiation unit 6. A carrying-in port 4a and a carrying-out port 4b are formed in the shield box 4.

The article A before inspection is conveyed into the shield box 4 from the carrying-in conveyor 91 through the carrying-in port 4a, and the article A after inspection is conveyed out to the carrying-out conveyor 92 from the shield box 4 through the carrying-out port 4b. An X-ray shielding curtain 21 configured to prevent leakage of X-rays is provided with each of the carrying-in port 4a and the carrying-out port 4b.

The conveying unit 5 is disposed inside the shield box 4, and conveys the article A from the carrying-in port 4a to the carrying-out port 4b so that the article A passes through the irradiation space R of X-rays. The conveying unit 5 is supported to the device main body 2. The conveying unit 5 includes a carrying conveyor 5A and a conveyor support unit 5B.

The X-ray irradiation unit 6 is disposed inside the shield box 4, and irradiates the article A that is conveyed by the carrying conveyor 5A with X-rays. For example, the X-ray irradiation unit 6 includes an X-ray tube that emits X-rays, and a collimator that spreads the X-rays emitted from the X-ray tube in a fan shape in a plane orthogonal to a conveying direction X.

The X-ray detection unit 7 is disposed inside the shield box 4, and detects X-rays transmitted through the article A and a belt B. For example, the X-ray detection unit 7 is configured as a line sensor. Specifically, the X-ray detection unit 7 includes a plurality of photodiodes which are one-dimensionally arranged along a horizontal direction orthogonal to the conveying direction X, and a scintillator arranged on an X-ray incident side with respect to the photodiodes. In this case, in the X-ray detection unit 7, x-rays incident to the scintillator are converted into light, and light incident to each of the photodiodes is converted into an electrical signal. The X-ray detection unit 7 is supported to the conveyor support unit 5B.

Figure 4:
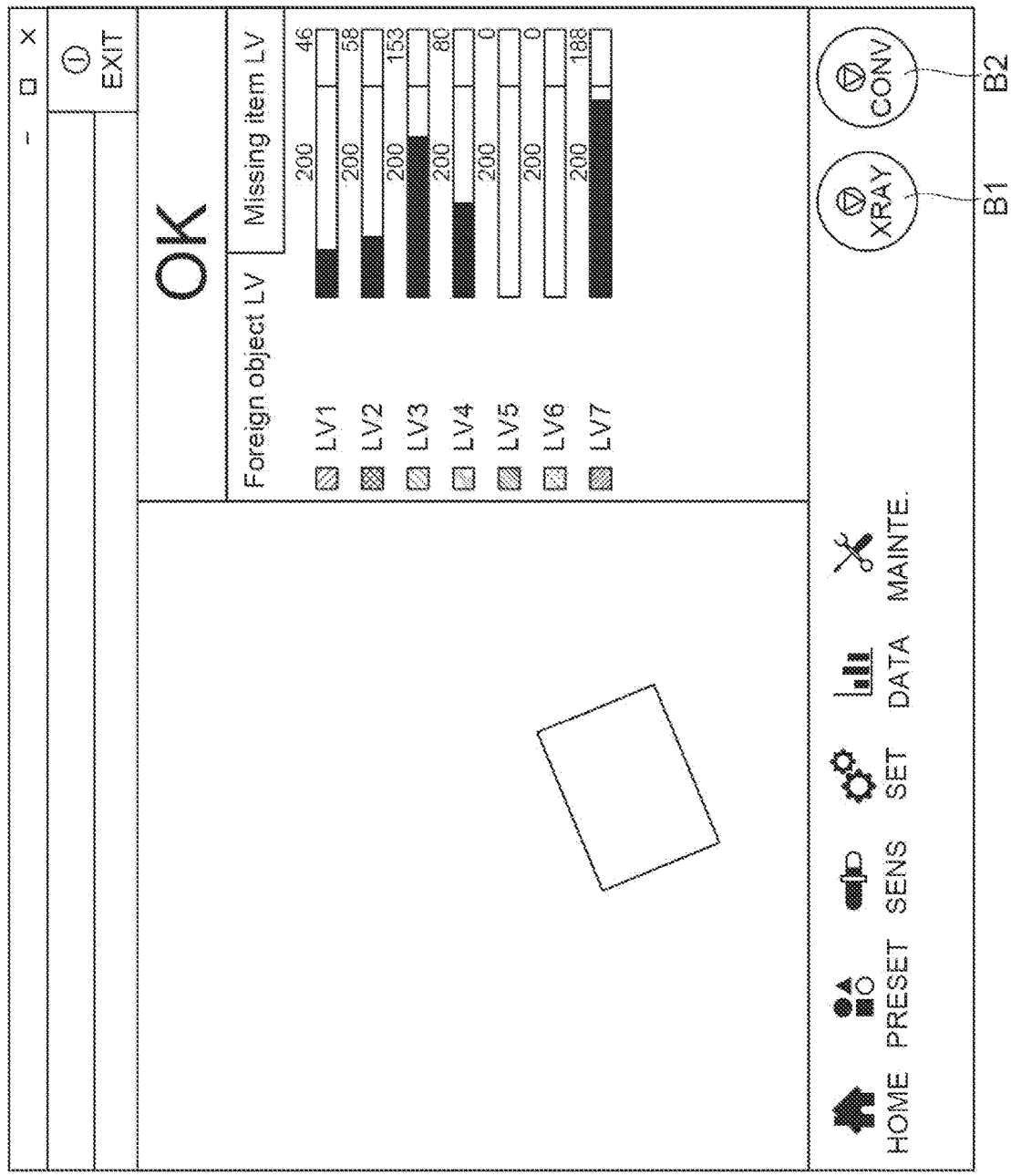
FIG. 4 is an example of a screen that is displayed on a display operation unit of the X-ray inspection device.
Figure 6:
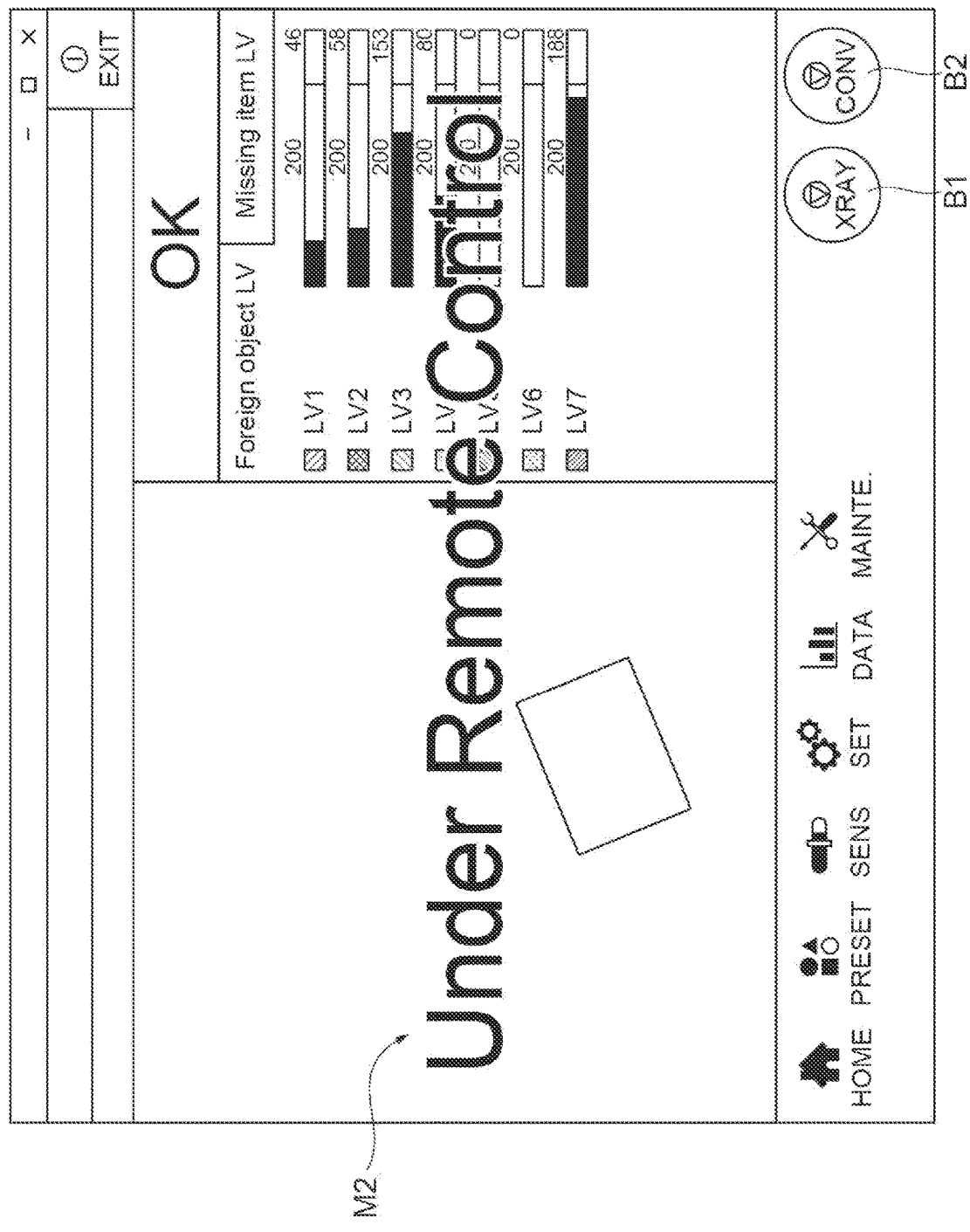
FIG. 6 is an example of the screen that is displayed on the display unit of the remote device.

The display operation unit 8 is provided in the device main body 2, and displays a state of the X-ray inspection device 1, accepts an input of various operation conditions in the X-ray inspection device 1, or displays an inspection result as illustrated in FIG. 4. For example, the display operation unit 8 displays an operation screen as a touch panel. In this case, an operator can input various conditions through the display operation unit 8. In addition, as illustrated in FIG. 6, when being remotely operated by a remote device 50, the display operation unit 8 displays the gist.

As illustrated in FIG. 1, the control unit 10 is disposed inside the device main body 2, and controls operations of respective units of the X-ray inspection device 1. The control unit 10 is constituted by a central processing unit (CPU), a read only memory (ROM), a random access memory (RAM), and the like. A signal that is output from the X-ray detection unit 7 and is A/D converted is input to the control unit 10. For example, the control unit 10 can be configured as software in which a program stored in the ROM is loaded on the RAM, and is executed by the CPU. The control unit 10 may be configured as hardware by an electronic circuit or the like. In the control unit 10, hardware such as the CPU, the RAM, and the ROM and software such as the program cooperate to constitute an inspection control unit 11 and an operation control unit 12.

The inspection control unit 11 controls the X-ray irradiation unit 6 and the X-ray detection unit 7 to execute a series of processing such as irradiation of the article A with X-rays, detection of X-rays transmitted through the article A, generation of an X-ray transmission image on the basis of the detected X-rays, and inspection of the article A on the basis of the X-ray transmission image. The operation control unit 12 controls operations of the X-ray irradiation unit 6, the X-ray detection unit 7, and the conveying unit 5.

Figure 3:
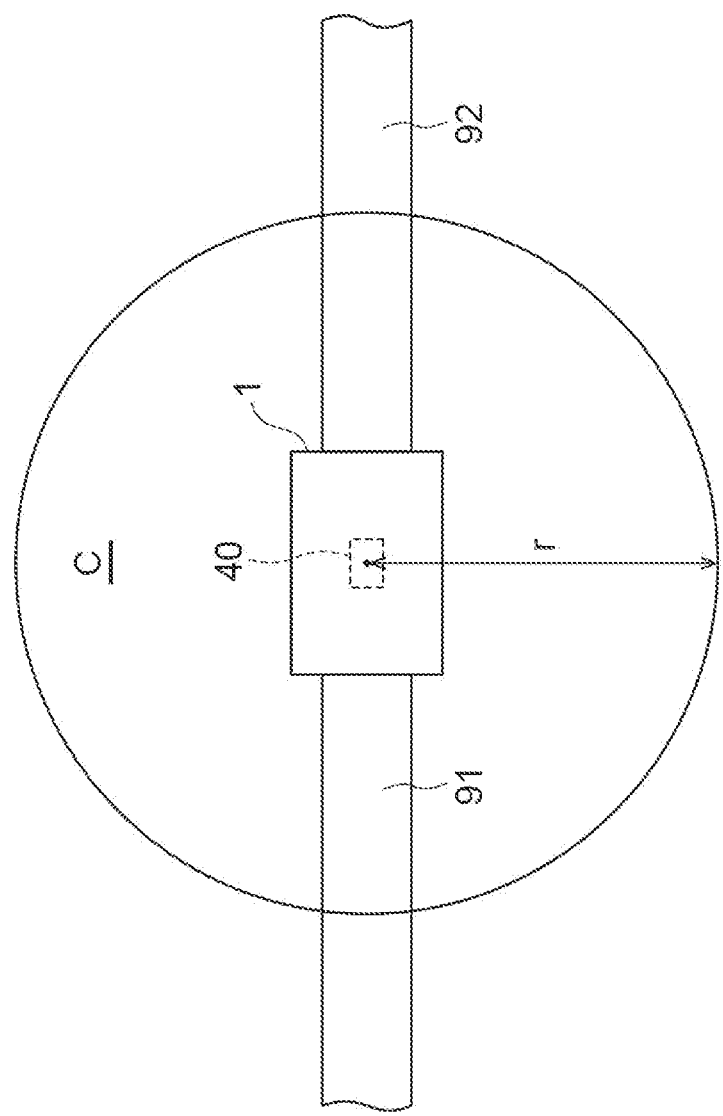
FIG. 3 is a view illustrating an example of a detection range of a laser scanner.

The laser scanner 40 illustrated in FIG. 2 is a device that acquires information on an ambient environment of the X-ray inspection device 1. Specifically, as illustrated in FIG. 3, the laser scanner 40 acquires presence or absence of an article within a range of a radius r (for example, 0.5 to 5 m) with the laser scanner 40 is set as a center, that is, within a range of the radius r (hereinafter, also referred to as a monitoring range C) with the X-ray inspection device 1 to which the laser scanner 40 is attached is set as a center. Note that, the monitoring range C of the laser scanner 40 is appropriately set in correspondence with a device configuration, a device size, a range to be monitored, or the like. A detection result by the laser scanner 40 is acquired by the remote device 50 through a network N (refer to FIG. 1).

As illustrated in FIG. 2, the laser scanner 40 is attached to the X-ray inspection device 1. More specifically, the laser scanner 40 is provided to detect an object located in a region on a downward side a conveying surface of the conveying unit 5 in a vertical direction Z. In this embodiment, the laser scanner 40 is attached to the support leg 3 that indirectly supports the conveying unit 5 and is located on a downward side of the conveying unit 5.

As illustrated in FIG. 1, the remote device 50 is connected at a location spaced apart from the X-ray inspection device 1 in a communication possible manner through the network N, and is provided to remotely operate the X-ray inspection device 1. The remote device 50 is constituted by a computer device that is used as a server or the like, a personal computer (PC) device, or the like. The remote device 50 includes a display unit (first display unit) 51, an operation unit 53, and a control unit 60.

The display unit 51 displays a state of the X-ray inspection device 1 that is remotely operated, accepts an input of various operation conditions in the X-ray inspection device 1, or displays an inspection result (refer to FIG. 4). For example, the display unit 51 is constituted by a monitor device. The display unit 51 of this embodiment displays a screen having the same configuration as in a screen that is displayed on the display operation unit 8 provided with the X-ray inspection device 1.

When displaying the screen having the same configuration as in the screen displayed on the display operation unit 8, the screen of the display operation unit 8 of the X-ray inspection device 1 that is remotely operated may be displayed on the display unit 51 in synchronization.

Figure 5:
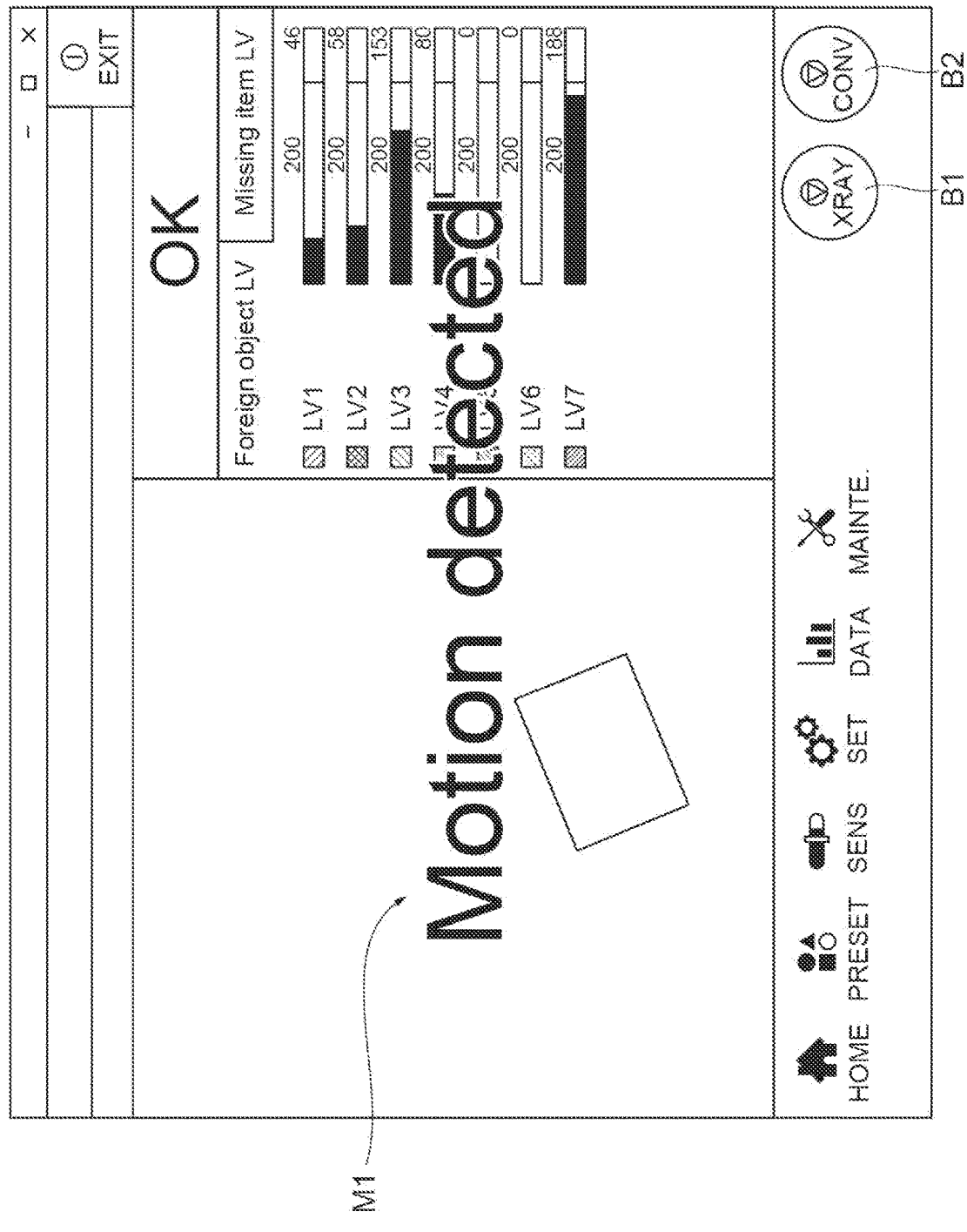
FIG. 5 is an example of a screen that is displayed on a display unit of a remote device.

As illustrated in FIG. 5, when the determination unit 62 determines that a worker is present within the monitoring range C to be described later in detail, the display unit 51 gives a notification of the gist (hereinafter, also referred to as warning notification). The warning notification may be notification given with character information M1, notification given with visual information through change of a color or display correspondence of the entire screen of the display unit 51, or notification with audio information through emission of a warning sound. Note that, the warning notification may also be given by the display operation unit 8 provided with the X-ray inspection device 1.

In addition, as illustrated in FIG. 6, the display unit 51 of this embodiment has a configuration capable of displaying that the remote device 50 is in remote operation in a case where the remote device 50 is remotely operating the X-ray inspection device 1. Displaying of the gist of remote operation may notification given with character information M2, notification given with visual information through change of a color or display correspondence of the entire screen of the display unit 51, or notification with audio information through emission of a warning sound. Note that, display of the gist indicating the remote operation is also performed by the display operation unit 8 provided with the X-ray inspection device 1 that is remotely operated.

The operation unit 53 is a part that operates the remote device 50 and the X-ray inspection device 1 through the remote device 50. For example, the operation unit 53 is constituted by an input device such as a mouse, a keyboard, and a touch panel. The operation unit 53 of this embodiment can select the X-ray inspection device 1 that is an object to be remotely operated, or can operate an operation of the X-ray inspection device 1 that is an object to be remotely operated.

The control unit 60 is constituted by a central processing unit (CPU), a read only memory (ROM), a random access memory (RAM), and the like. For example, the control unit 60 can be constituted by software in which a program stored in the ROM is loaded on the RAM, and is executed by the CPU. The control unit 60 may be constituted by hardware by an electronic circuit or the like. In the control unit 60, hardware such as the CPU, the RAM, and the ROM, and software such as a program cooperate to constitute a reception unit 61, a determination unit 62, a transmission unit 63, and a remote control unit 64.

The reception unit 61 is a part that acquires various pieces of information in the X-ray inspection device 1 from the X-ray inspection device 1. In addition, the reception unit 61 is also a part that acquires information on presence or absence of an object within the monitoring range C which is acquired by the laser scanner 40.

The determination unit 62 is a part that determines whether or not a worker is present in a vicinity of the article handling device on the basis of information on an ambient environment which is acquired by the laser scanner 40. More specifically, the determination unit 62 determines whether or not a work exist within the monitoring range C of the laser scanner 40. For example, specification of a worker by the determination unit 62 can be made by acquiring information of a moving object within the monitoring range C from the laser scanner 40, or by superimposing information, which is stored in advance, on a device or the like locating within the monitoring range C and a detection result by the laser scanner 40 on each other. When detecting that a worker is present within the monitoring range C, the determination unit 62 displays the gist on the display unit 51.

The transmission unit 63 is a part that transmits the determination result (information on whether or not a worker is present within the monitoring range C) determined by the determination unit 62 to the remote control unit 64. The transmission unit 63 of this embodiment transmits the determination result obtained by the determination unit 62 only in at least one operation between irradiation with X-rays by the X-ray irradiation unit 6 and the operation of the conveying unit 5.

The remote control unit 64 is a part that controls an operation of the X-ray inspection device 1 that is an object to be remotely operated. When the X-ray inspection device 1 that is an object to be remotely operated is selected by the operation unit 53, as illustrated in FIG. 5, the remote control unit 64 initiate display of the gist indicating a specific X-ray inspection device 1 is in remote operation on the display unit 51, and initiates remote control of the selected X-ray inspection device 1.

The remote control unit 64 of this embodiment restricts an operation content that can be operated with respect to the X-ray inspection device 1 by the remote device 50 on the basis of a determination result in the determination unit 62. Specifically, in a case where the determination unit 62 determines that a worker does not exist, as illustrated in FIG. 5, the remote control unit 64 controls an operation of the X-ray inspection device 1 in accordance with an operation content through an operation screen that is displayed on the display unit 51. For example, when an X-ray irradiation button B1 is operated by an operator, the remote control unit 64 causes the X-ray irradiation unit 6 to perform irradiation with X-rays through the control unit 60 of the X-ray inspection device 1. In addition, for example, when a conveyance initiation button B2 is operated by an operator, the remote control unit 64 causes the conveying unit 5 to operate through the control unit 60 of the X-ray inspection device 1.

On the other hand, in a case where the determination unit 62 determines that a worker is present, as illustrated in FIG. 5, the remote control unit 64 sets, for example, the X-ray irradiation button B1 and the conveyance initiation button B2 in the operation screen displayed on the display unit 51 as non-display. That is, in a case where the determination unit 62 determines that a worker is present, the remote control unit 64 restricts irradiation with X-rays by the X-ray irradiation unit 6 of the X-ray inspection device 1 and the operation of the conveying unit 5 which are operated from the remote device 50.

An operational effect in the article handling system 100 of the embodiment will be described. In the article handling system 100 of the embodiment, a determination result determined on the basis of information relating to an ambient environment of the X-ray inspection device 1 which is acquired by the laser scanner 40 can be confirmed in the remote device 50 that is disposed at a location spaced apart from the X-ray inspection device 1. That is, in the remote device 50, since presence or absence of a worker being present in the vicinity of the X-ray inspection device 1 can be confirmed, the X-ray inspection device 1 can be remotely operated while ensuring safety for the worker.

In the article handling system 100 of the embodiment, the transmission unit 63 transmits the determination result in a case where at least one of the X-ray irradiation unit 6 and the conveying unit 5 is operating. According to this, in a case where there is a possibility of posing a danger to the worker in the vicinity of the X-ray inspection device 1, since information on presence or absence of the worker being present in the vicinity of the X-ray inspection device 1 can be reliably obtained, it is possible to prevent a danger from being posed to the worker in advance.

In the article handling system 100 of the embodiment, the remote control unit 64 restricts the operation content that can be operated with respect to the X-ray inspection device 1 by the remote device 50 on the basis of the determination result obtained by the determination unit 62. According to this, since it is restricted to perform an operation that may pose a danger to a worker being present in the vicinity of the X-ray inspection device 1 on the basis of a situation of the worker being present in the vicinity of the X-ray inspection device 1, it is possible to prevent a danger from being posed to the worker in advance.

In the article handling system 100 of the embodiment, since the remote device 50 includes the display unit 51 having a configuration capable of displaying the determination result obtained by the determination unit 62, it is possible to effectively notify an operator with a situation of the worker being present in the vicinity of the X-ray inspection device 1.

In the article handling system 100 of the embodiment, the X-ray inspection device 1 includes the display operation unit 8 that display own state, and the display unit 51 and the display operation unit 8 have a configuration capable of displaying whether or not the X-ray inspection device 1 is being remotely operated by the remote device 50. According to this, since an operator who operates the X-ray inspection device 1 and an operator who operates the remote device 50 can perform an operation while confirming that a device to be operated is in which state, it is possible to prevent an operation that poses a danger to a worker from being executed.

In the article handling system 100 of the embodiment, since the laser scanner 40 is provided to detect an object located in a region on a downward side of the conveying surface of the conveying unit 5 in the vertical direction Z, it is easy to detect a worker being present in the vicinity of the X-ray inspection device 1 regardless of a body size and a posture of the worker.

Hereinbefore, description has been given of the embodiment, but the invention is not limited to the embodiment. Various modifications can be made within a range not departing from the gist of the invention.

Modification Example 1

Figure 7:
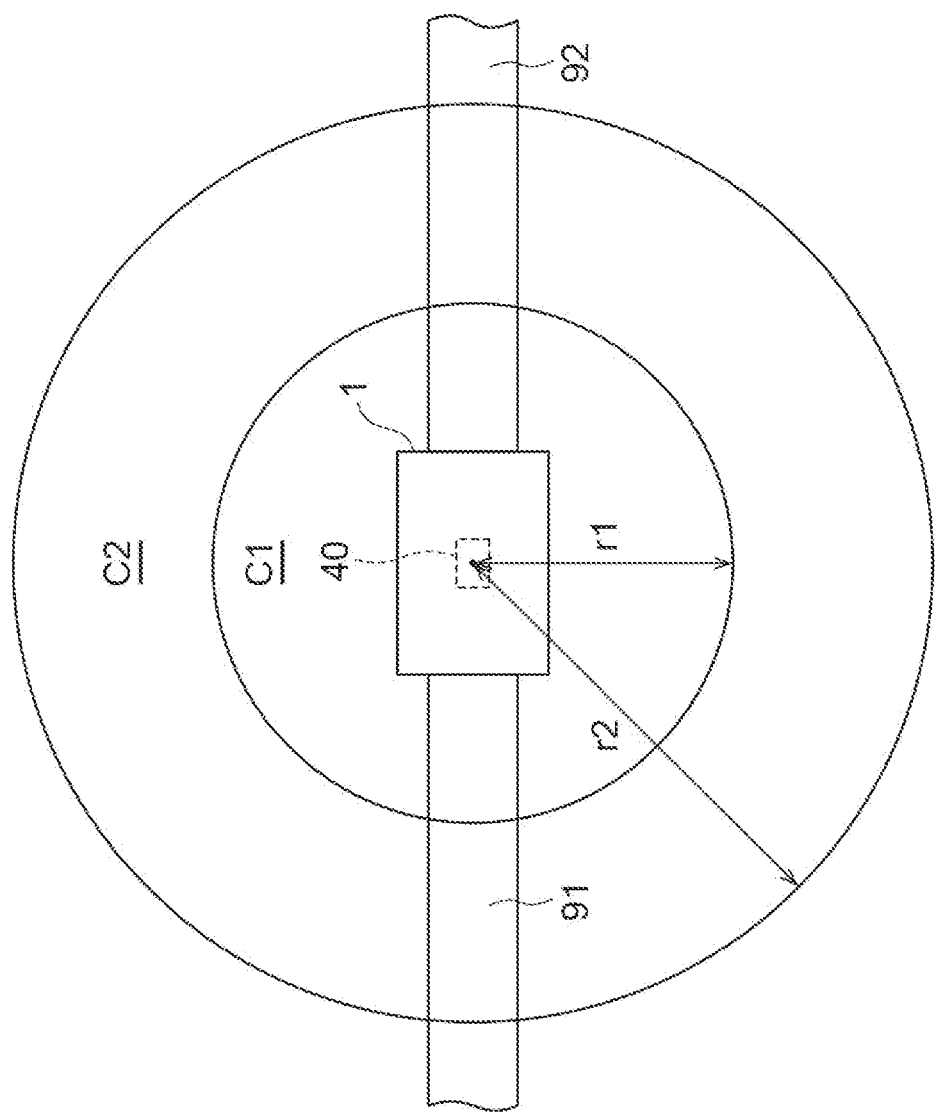
FIG. 7 is a view illustrating a modification example of the detection range of the laser scanner.

In the embodiment, as illustrated in FIG. 3, description has been given with reference to an example in which the laser scanner 40 detects an object being present within a range of the radius r with the X-ray inspection device 1 set as a center, but there is no limitation to the example. For example, as illustrated in FIG. 7, a laser scanner (acquisition unit) 40, which can acquire information on a first region C1 that is a region within a first distance r1 (for example, 0.5 to 3.0 m) from a position (reference position) where the X-ray inspection device 1 is disposed, and information on a second region C2 being a region outside of the first region C1 and within a second distance r2 (for example, 3.0 to 5.0 m) longer than the first distance r1, may be used. The laser scanner 40 acquires information on presence or absence of an object as the information on the first region C1 and the information on the second region C2.

In an article handling system 100 provided with the above-described laser scanner 40 according to Modification Example 1, the determination unit 62 determines whether or not a worker is present in the first region C1 on the basis of the information on the first region C1, and determines whether or not a worker is present in the second region C2 on the basis of the information on the second region C2. In addition, in a case where it is determined that a worker is present in the first region C1, the remote control unit 64 severely restricts the operation content that can be operated with respect to the X-ray inspection device 1 by the remote device 50 in comparison to a case where it is determined that the worker is present in the second region C2.

Specifically, for example, in a case where it is determined that a worker exits in the second region C2, as illustrated in FIG. 5, the remote control unit 64 sets only the X-ray irradiation button B1 in the operation screen displayed on the display unit 51 as non-display, and in a case where it is determined that a worker is present in the first region C1, the remote control unit 64 sets both the X-ray irradiation button B1 and the conveyance initiation button B2 as non-display. That is, in a case where the determination unit 62 determines that a worker is present in the second region C2, the remote control unit 64 restricts irradiation with X-rays by the X-ray irradiation unit 6 of the X-ray inspection device 1 from the remote device 50, and in a case where the determination unit 62 determines that a worker is present in the first region C1, the remote control unit 64 restricts irradiation with X-rays by the X-ray irradiation unit 6 of the X-ray inspection device 1 and also restricts operation of the conveying unit 5 from the remote device 50.

In the article handling system 100 according to Modification Example 1, an operation that is restricted in the X-ray inspection device 1 is appropriately set on the basis of a positional relationship between the X-ray inspection device 1 and a worker, and thus it is possible to suppress handling capability of the X-ray inspection device 1 from deteriorating.

Modification Example 2

In the article handling system 100 of the embodiment and the modification example, description has been given with reference to an example provided with the remote control unit 64 configured to restrict the operation content that can be operated with respect to the X-ray inspection device 1 by the remote device 50 on the basis of the determination result of the determination unit 62, but there is no limitation to the example. For example, an operation control unit 12 (refer to FIG. 1) configured to restrict which operation can be performed by the remote device 50 on the X-ray inspection device 1 on the basis of a determination result may be provided instead of the function of the remote control unit 64. The operation control unit 12 is provided with the X-ray inspection device 1.

In an article handling system 100 according to Modification Example 2, as in the above-described embodiment, it is restricted to execute an operation that may pose a danger a worker being present in the vicinity of the X-ray inspection device 1 on the basis of a situation of the worker being present in the vicinity of the X-ray inspection device 1, and thus it is possible to prevent a danger from being posed to the worker in advance.

In addition, the laser scanner 40 of Modification Example 1 may be applied to the configuration of Modification Example 2, and in a case where it is determined that a worker is present in the first region C1, the operation control unit 12 may severely restrict which operation can be performed by the remote device 50 on the X-ray inspection device 1 in comparison to a case where it is determined that the worker is present in the second region C2. Even in this configuration, an operation that is restricted in the X-ray inspection device 1 is appropriately set on the basis of a positional relationship between the X-ray inspection device 1 and the worker, and thus it is possible to suppress the processing capability of the X-ray inspection device 1 from deteriorating.

Other Modification Examples

In the article handling system 100 according to the embodiment and the modification examples described above, description has been given with reference to an example in which the laser scanner 40 configured to detect presence or absence of an object within the monitoring range C (C1, C2) is applied as an acquisition unit that acquires information ion an ambient environment of the X-ray inspection device 1. However, for example, an imaging device that captures an image may be applied. Even in this case, it is possible to determine whether or not a worker is present within the monitoring range C (C1, C2), for example, by the determination unit 62 that analyzes the image captured by the imaging device by using a known technology. In addition, a millimeter wave radar may be applied as the acquisition unit.

In the article handling system 100 according to the embodiment and the modification examples described above, description has been given with reference to an example in which the screen displayed on the display operation unit 8 provided with the X-ray inspection device 1 is synchronized with the display unit 51 of the remote device 50, but a screen, which is an aspect different from the screen displayed on the display operation unit 8 and shows a state of the X-ray inspection device 1 which includes information on whether or not the X-ray inspection device 1 is in a remote operation state, may be displayed.

In the article handling system 100 according to the embodiment and the modification examples described above, description has been given with reference to an example in which the determination unit 62 that determines whether or not a worker is present in the vicinity of the article handling device on the basis of information on an ambient environment which is acquired by the laser scanner 40 is provided with the remote device 50, but there is no limitation to the example. The determination unit 62 may be provided integrally with the laser scanner 40 or may be configured as the control unit 10 of the X-ray inspection device 1.

In the article handling system 100 according to the embodiment and the modification examples described above, description has been given with reference to the X-ray inspection device 1 as the article handling device that becomes a remote operation target. However, for example, one or a plurality of devices such as a conveying device, a metal inspection device, a packaging device, and a weight inspection device may be applied as the article handling device instead of or in addition to the X-ray inspection device 1.

What is claimed is:

1. An article handling system comprising:
    an article handling device including an article handling unit configured to execute handling with respect to an article, a conveying unit configured to convey the article into the article handling unit and to convey the article out from the article handling unit, and a first CPU; and
    a remote device connected at a location spaced apart from the article handling device so as to enable communication over a network, and including a second CPU configured to perform remote control of the article handling device, wherein
    the first CPU is configured to acquire information on an ambient environment of the article handling device, and to transmit the information on the ambient environment of the article handling device to the second CPU,
    the second CPU is configured to determine whether or not a worker is present in a vicinity of the article handling device on the basis of the information on the ambient environment, and
    one of the first CPU and the second CPU is configured to restrict the remote control of the article handling device based on a determination result so that the operation of the remote control of the article handling device is more restricted in a case where it is determined that the worker is present in the vicinity of the article handling device than in a case where it is determined that the worker is not present in the vicinity of the article handling device.

2. The article handling system according to claim 1, wherein the the second CPU is further configured to restrict the operation of the remote control of the article handling device in a case where at least one of the article handling unit and the conveying unit is operating.

3. The article handling system according to claim 1, wherein the second CPU is configured to restrict which operation can be performed by the remote device on the article handling device on the basis of the determination result.

4. The article handling system according to claim 3, wherein the the first CPU is configured to acquire information on a first region being a region within a first distance from a reference position and information on a second region being a region outside of the first region and within a second distance longer than the first distance, the reference position being set as a position where the article handling device is disposed,
    the second CPU is configured to determine whether or not the worker is present in the first region on the basis of the information on the first region, and to determine whether or not the worker is present in the second region on the basis of the information on the second region, and
    in a case where it is determined the worker is present in the first region, the second CPU is configured to severely restrict which operation can be performed by the remote device on the article handling device in comparison to a case where it is determined that the worker is present in the second region.

5. The article handling system according to claim 1, wherein the first CPU is configured to restrict which operation can be performed by the remote device on the article handling device on the basis of the determination result.

6. The article handling system according to claim 5, wherein the first CPU is configured to acquire information on a first region being a region within a first distance from a reference position, and information on a second region being a region outside of the first region and within a second distance longer than the first distance, the reference position being set as a position where the article handling device is disposed,
    the second CPU is configured to determine whether or not the worker is present in the first region on the basis of the information on the first region, and to determine whether or not the worker is present in the second region on the basis of the information on the second region, and
    in a case where it is determined the worker is present in the first region, the first CPU is configured to severely restrict which operation can be operated by the remote device on the article handling device in comparison to a case where it is determined that the worker is present in the second region.

7. The article handling system according to claim 1, wherein the remote device includes a first display unit configured to enable displaying of the determination result.

8. The article handling system according to claim 7, wherein the article handling device includes a second display unit configured to display a state of the article handling device, and
    the first display unit and the second display unit are configured to enable displaying of whether or not the article handling device is being remotely controlled by the remote device.

9. The article handling system according to claim 1, wherein the first CPU is coupled to a sensor configured to detect an object located in a region below a conveying surface of the conveying unit in a vertical direction.

10. The article handling system according to claim 9, wherein the sensor is attached to the article handling device.

11. The article handling system according to claim 1, wherein the article handling device is an X-ray inspection device including an X-ray irradiation unit configured to irradiate the article with X-rays as the article handling unit, and the conveying unit configured to convey the article into a position where irradiation with the X-rays is performed by the X-ray irradiation unit and to convey the article out from the position.

* * * * *